Figure 1:
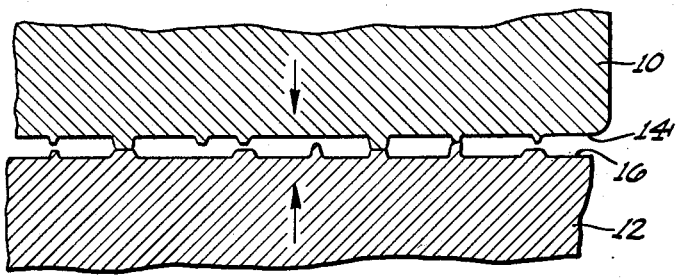

Oct. 27, 1959  K. R. ELDREDGE  2,910,012
METHOD AND MEANS FOR INCREASING FRICTION
Filed May 21, 1956

KENNETH R. ELDREDGE
INVENTOR.

BY *Lyon & Lyon*
ATTORNEYS

United States Patent Office 2,910,012
Patented Oct. 27, 1959

2,910,012

METHOD AND MEANS FOR INCREASING FRICTION

Kenneth R. Eldredge, Palo Alto, Calif., assignor to Stanford Research Institute, Palo Alto, Calif., a corporation of California Application May 21, 1956, Serial No. 585,993

2 Claims. (Cl. 105—76)

The problem of how to increase the coefficient of friction between the contiguous surfaces of two metal bodies is one which can arise, for example, every time it is desired to start a railroad car, or stop one, or climb a steep grade. The wheels can be stopped or rotated adequately as required, but there is slippage between wheels and tracks. The tracks and wheels usually have a thin coating of grease or oil which considerably reduces the coefficient of friction and thus reduces traction. Even without such coating the coefficient of friction between the two metal bodies is not too high. Usually, sand is dropped to increase the friction and while it does help increase traction to a certain extent it is not completely satisfactory. Furthermore, the sand provides deleterious side effects, besides being an abrasive whereby the available life of wheels and tracks are shortened.

An object of the present invention is the provision of an improved method and means for increasing the coefficient of friction between two contiguous conductive metal bodies.

A further object of the present invention is the provision of an improved method and means for controlling an increase in the coefficient of friction between two contiguous conductive metal bodies.

Yet a further object of the present invention is the provision of a novel and improved method and means for increasing the coefficient of friction between two contiguous conductive metal bodies which does not abrade the metal bodies.

Still another object of the present invention is to provide a novel and improved method and means for assisting in preventing sliding between the metal wheels of a vehicle and the tracks on which they roll.

These and other objects of the invention are achieved in an arrangement whereby, when it is desired to prevent sliding between two conductive metal bodies, an electric current is caused to flow between the two bodies across the contiguous surfaces therebetween. To achieve an optimum result, the current should be increased with increases in the compressive load between the two bodies. The current values bear a definite mathematical relationship to the values of the compressive loads. One preferred relationship which has been found, is one wherein the current values vary approximately as the square root of value of the compressive load on the two bodies. The current should not be permitted, however, to attain a value at which welding of the two bodies occurs.

Figure 2:
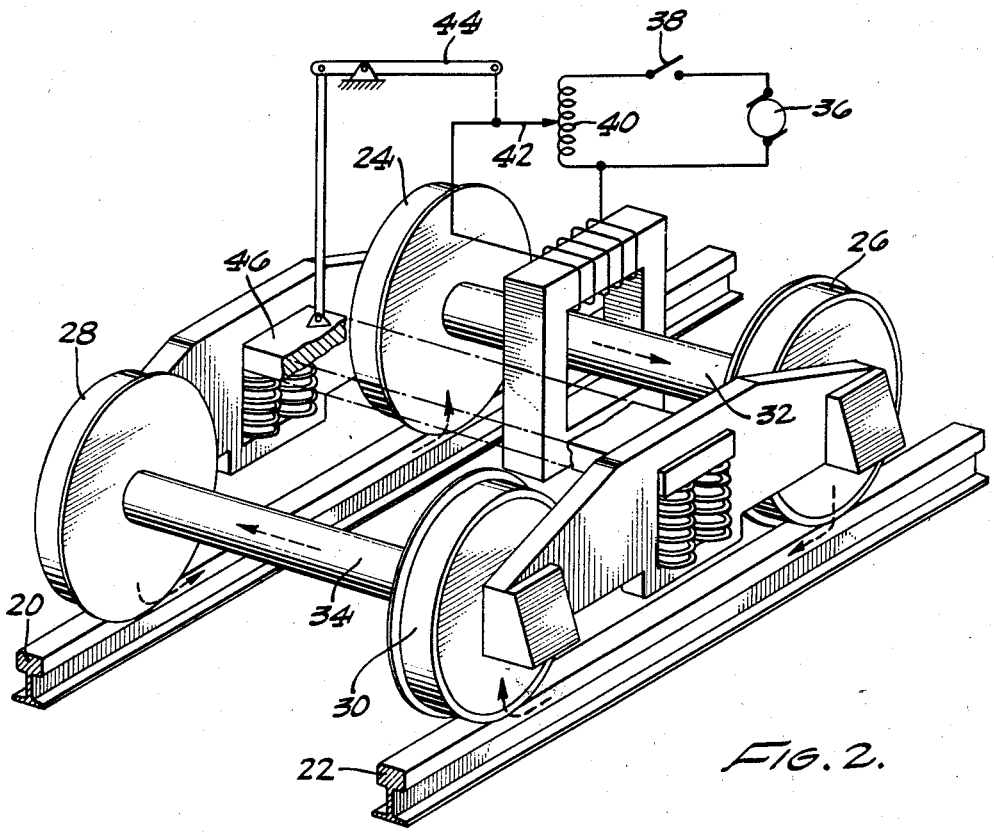

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1 is a diagram shown for illustrating the principles involved in the embodiment of this invention; and Figure 2 is a diagram showing one embodiment of this invention.

Referring now to Figure 1, there may be seen a diagram which illustrates the principles involved. Two metallic conductive bodies 10, 12 have contiguous surfaces 14, 16. Figure 1 may be considered in effect a microview in section of the two metallic bodies and their contiguous surfaces. The actual areas of contact of the two bodies usually occurs at the highest of the high points of the two contiguous surfaces. The coefficient of friction of these two bodies is a function of the actual areas of contact. Obviously, the more of these there are, the greater the coefficient of friction and the greater the force resisting any tendency to slide. This is true whether the bodies are relatively stationary or are relatively moving. An increase in the compressive load on these two bodies tends to deform or flatten the high points first in contact so that more of the "less high" high points will come in contact.

Any lubricant or other like material coming between the two surfaces in effect maintains a separation of the high-peak areas and prevents to a degree direct metallic contact. The forces required to shear the lubricant are less than those required to shear metallic surfaces directly in contact and the coefficient of friction becomes correspondingly less.

I have found that by applying a voltage across the two bodies so that a current is caused to flow across the contiguous surfaces, the coefficient of friction may be increased, even in the presence of a lubricant. Moreover, by causing an electric current to flow between the two bodies across the contiguous surfaces, I have been able to increase the static coefficient of friction from 0.2 to a value on the order of one. The amplitude of the current required to obtain a coefficient of friction on the order of one varies approximately in proportion to the square root of the compressive load applied to the two bodies. The presence of a lubricant increases the amount of current required to obtain a given value of the cofficient of friction over that required without the presence of a lubricant, but such increase does not affect the above-recited proportional variation for obtaining a coefficient of friction on the order of one. I have further found that the amount of current required to achieve a given increased coefficient of friction is an inverse function of the conductivity of the metal.

It should be noted that in all cases the amount of current used must be kept below the value which would cause welding of the metal bodies. I have found that for a ten-to-one load variation values of current were varied from 75 to 175 amperes to provide a coefficient of friction on the order of one between two iron bodies having their contiguous surfaces lubricated by paraffin. The voltage required to provide such current was extremely low, since the voltage drop across the contiguous surfaces was on the order of tenths of a volt.

While what happens as a result of the application of current across the contiguous surfaces of the metal bodies to cause the increase in resistance is not exactly known, the most accepted reason is that the current produces heat at the contiguous surfaces which melts away or evaporates any lubricant present and which then causes a flow or deformation of the highest high points to an extent wherein some of the "next highest" high points can come in contact. Thus, an increase in area is obtained with a consequent increase in the coefficient of friction. This effect can be increased with an increase in current flow but must be stopped before the metal becomes structurally weak. Still another possible explanation advanced is that the extent of contact areas remains the same, but changes are made in the nature of these contact-area surfaces which increase the coefficient of friction.

Figure 2 shows one application of the principles set forth in this invention. This is shown by way of illustration only and is not to be construed as a limitation upon the invention. A pair of tracks 20, 22, or rails, are provided upon which a train or trolley or other rail-using vehicle runs. The body of the vehicle is omitted. There are only shown two pairs of wheels 24, 26, 28 and 30. It is appreciated that a train engine may have more, but the explanation of the operation for these four wheels will suffice to convey an understanding of the application of the invention to the remainder of the train. Each pair of wheels is associated with an axle 32, 34.

A source of voltage 36 is connected through a suitable switch 38 to an auto transformer 40. The variable output arm 42 of the auto transformer is preset to a value whereby an amount of current is derived to secure a desired coefficient of friction, when the vehicle is empty. Since, with load, the body of the vehicle moves downward as the springs on which it rests are compressed, this motion of the vehicle body can be used for controlling the amplitude of the current which flows. The variable arm is coupled to a portion of the vehicle body in a manner so that as the load in the car increases the current flow is increased. The total value of the current is controlled to bear a definite mathematical relationship to the total load. Thus, the value of the current may be made to be in proportion to the square root of the load. Such coupling may be made by way of a lever and fulcrum 44 which may be moved by vertical movement of the car 46 in response to varying load. The switch 38 may be actuated when it is desired to start or stop the car, or to ascend a steep grade when added traction is necessary.

The output of the auto transformer is applied to the primary winding of a step-down transformer. The single-turn secondary is the axle 32. Current flows as shown by the arrows through one wheel, one rail, across to the other rail, and back through the wheel 24 to the axle 32.

The use of a current flow to increase the coefficient of friction does not wear the wheels and tracks to any degree near the extent caused by sand. There are no other deleterious side effects created. The increase in the coefficient of friction is greater than that obtained by using sand. The cost of the equipment for obtaining the results set forth herein is, in the long run, far less than that for obtaining the sand required over the life of the vehicle and for making repairs as a result of the side effects caused by the use of sand.

It should be pointed out here that whether direct current or alternating current is used in the embodiment of the invention is immaterial, since the effects derived are dependent upon the amount of current flow across the boundary between the two metal bodies. However, a low-frequency alternating current is preferred. Thus, an alternative arrangement to that shown could be to use the rotating wheels as homopolar generators. However, with this arrangement, no current would be available for increasing traction at starting times.

There has accordingly been shown and described above a novel, useful, and simple method and apparatus for increasing the coefficient of resistance between two conductive metal bodies having contiguous surfaces and under a compressive load. Although the illustration of the employment of the principles of the invention was that for increasing the coefficient of friction for railway cars, it will be appreciated that this is not to be construed as a limitation since other uses may occur to those skilled in the art, such as for metallic disc or other type clutches, without departing from the spirit of the invention or the scope of the claims.

I claim:

1. In a railway system for increasing the traction between the wheels and tracks of a train the method of increasing the coefficient of friction between the wheels and tracks of a vehicle in said train comprising applying a voltage across said wheels and tracks when it is desired to increase traction to cause an electric current to flow between said wheels and tracks, and varying said voltage with variations in total weight of said vehicle to provide values of current which vary substantially proportionally as the square root of the weight of said vehicle, the value of said current at all times being less than the welding current of said wheels and tracks.

2. In a railway system, the method of increasing the coefficient of friction between the wheels and tracks of a vehicle in said system comprising applying a voltage across said wheels and tracks when it is desired to increase traction to cause an electric current to flow between said wheels and tracks, and varying said voltage with variations in total weight of said vehicle to increase the values of said current with an increase in the total weight of said vehicle and to maintain a definite mathematical relationship between the total values of said current and the total weight of said vehicle with said current at all times being less than the welding current of said wheels and tracks.

References Cited in the file of this patent

UNITED STATES PATENTS

| | | |
|---|---|---|
| 379,815 | Ries | Mar. 20, 1888 |
| 379,909 | Ries | Mar. 20, 1888 |
| 442,365 | Dewey | Dec. 9, 1890 |